March 31, 1953     G. E. PORTER     2,633,001
ASSISTER FOR HYDRAULIC BRAKE SYSTEMS
Filed July 11, 1947     4 Sheets-Sheet 1

INVENTOR.
GILBERT E. PORTER
BY
Christie & Angus
ATTORNEYS

March 31, 1953  G. E. PORTER  2,633,001
ASSISTER FOR HYDRAULIC BRAKE SYSTEMS
Filed July 11, 1947  4 Sheets-Sheet 3

INVENTOR.
GILBERT E. PORTER
BY
Christie & Angus
ATTORNEYS

March 31, 1953  G. E. PORTER  2,633,001
ASSISTER FOR HYDRAULIC BRAKE SYSTEMS
Filed July 11, 1947  4 Sheets-Sheet 4

INVENTOR.
GILBERT E. PORTER
BY
ATTORNEYS

Patented Mar. 31, 1953

2,633,001

UNITED STATES PATENT OFFICE 2,633,001

ASSISTER FOR HYDRAULIC BRAKE SYSTEMS

Gilbert E. Porter, North Hollywood, Calif.

Application July 11, 1947, Serial No. 760,404

16 Claims. (Cl. 60—54.5)

This invention relates to hydraulic braking aids and has for an object to provide effective, simple and economical means for effecting strong braking action with a minimum of effort.

In the conventional hydraulic brake as used on motor vehicles, a quantity of oil or other hydraulic fluid is contained within a closed system including a reservoir or master cylinder coupled with fluid lines leading from the master cylinder to each braking unit. Normally a motor vehicle will be provided with a braking unit in association with each wheel. The braking units, which form no part of the present invention, consist of brake shoes adapted to be expanded against the inner walls of the braking cylinder responsive to the transmission of fluid pressure from the master cylinder. The fluid pressure is ordinarily developed in the master cylinder by means of a piston located therein and hereinafter referred to as the master piston, which piston is operably connected to the brake pedal. When the brake pedal is depressed the piston forces fluid from the master cylinder through the various fluid lines to expand the brake shoes against the brake drums. Due to the substantial non-compressibility of liquids, once the brake shoes are set against the drums a very small additional displacement of the piston will greatly increase the braking pressure exerted on the shoes.

In practice, the comparatively high pressure required to brake a conventional automobile quickly (for example, about 750 to 1500 lbs. per sq. in.) is obtainable by the mechanical advantage gained from the leverage provided between the brake pedal and the master piston. This provision of leverage is, of course, attended by a corresponding increase in necessary brake pedal stroke to displace a given amount of fluid from the master cylinder over that required if no leverage were employed. The degree of leverage is limited by the amount of pedal stroke allowed in the vehicle design. For example, to double the mechanical advantage, either by doubling the leverage or by reducing the size of the master cylinder in relation to the area of applied pressure, would require twice the pedal travel. Such increase in pedal travel, which is known in the art as "loss of pedal," is undesirable in most motor vehicles.

It is one of the objects of the present invention to provide braking pressure boosting apparatus capable of multiplying the "critical" braking pressure without substantial loss of pedal. By critical braking pressure I refer to the incremental pressure required for effective braking after the brake shoes have been expanded against the brake drums by the "initial" braking pressure.

The conventional hydraulic braking system is a free flowing system, i. e. the return flow of fluid from the fluid lines to the master cylinder is unimpeded, and any "slacking off" on the brake pedal will result in an immediate corresponding decrease in braking pressure. Thus, when high braking pressures are required, as is the case in holding a vehicle on a steep grade or during rapid deceleration it is necessary to maintain a constant strong thrust on the brake pedal. This is not only inconvenient but is at times difficult, particularly for female drivers or when a vehicle is heavily loaded. A sudden thrust on the brake pedal developing momentarily a high braking pressure is not difficult to produce but to maintain the same pressure requires considerably more exertion.

It is accordingly another object of the invention to provide apparatus adapted to hold a compounded braking pressure with a reduced pedal pressure, thereby extending the period through which the force developed by an initial thrust will be effective. It is also within the contemplation of the invention to combine in one apparatus the features of a braking pressure booster and a braking pressure holder, or alternatively to provide apparatus for accomplishing these objectives separately.

The above contemplated and other objects of the invention are accomplished according to one feature of the invention by the provision of apparatus which permits pre-loading of the brakes through the initial braking pressure by conventional means and accompanied by normal brake pedal depression. At such time as the brakes are pre-loaded, i. e. when the brake shoes have been expanded against the drums, the apparatus of the invention alters the conditions of the fluid system so that the effect of continued depression of the brake pedal will have a compounding effect on the hydraulic pressure transmitted to the brake shoes. Because of the fact that the initial pressure is applied normally and the multiplication or pressure boosting is deferred until the non-compressibility of the hydraulic fluid becomes an important factor, the pressure multiplication is obtained at the critical pressure stage without any substantial increase in required pedal stroke, i. e. with a minimum loss of pedal.

By my invention I am furthermore enabled to hold the compounded braking pressure once established or to hold a compounded pressure within a certain range of the maximum braking pressure by preventing the return flow of hydraulic fluid to the master cylinder until a pre-selected reduced pedal pressure has been reached.

The equipment according to my invention is adapted to be connected in the hydraulic system in series with the master cylinder so that all of the fluid discharged from the master cylinder by the stroke of the master piston flows through or into the braking aid.

According to another feature of my invention, multiplying of the braking pressure is especially provided for, while at the same time there is incorporated a holding action. In carrying out this feature according to one embodiment I provide two separate chambers in the fluid system, both receiving pressure from the master cylinder and a third chamber separate from the two chambers. A check valve separates the first and third chambers and a second check valve separates the second and third chambers and means are provided for transmitting pressure from the third chamber to the individual braking units. The first check valve, which is normally open, is adapted to close responsive to fluid pressure and the second check valve, which is normally closed, is adapted to open responsive to fluid pressure. A piston is disposed in the third chamber and is adapted to exert a pressure on the fluid contained therein responsive to the introduction of pressure from the second to the third chamber. This piston is so proportioned as to multiply the applied pressure, as hereinafter more particularly described.

In other forms of the invention, the braking pressure holding feature is accentuated. In one such embodiment, I provide a chambered member having inlet and outlet openings and a piston, spring loaded against the inlet pressure, and separating the inlet and outlet openings. Means are provided for preventing fluid flow from the outlet end of the chambered member to the inlet end until the pedal pressure has been reduced below the spring loading of the piston. In this type of device, pressure developed in the master cylinder is transmitted through the chambered member to the braking units as that pressure is increased by depression of the brake pedal. When the pedal pressure is reduced, the outlet end of the chambered member is isolated from the inlet end by the aforementioned means, and the compounded braking pressure is thus maintainable by a reduced pedal pressure. At any desired reduced pedal pressure, dependent upon the spring loading of the piston, the outlet and inlet chamber are opened into each other and the compounded braking pressure is relieved.

The foregoing and other embodiments of the invention will be more clearly understood from the following detailed description thereof taken with reference to the accompanying drawings, in which.

Each of the various embodiments of my invention makes use of the action of the hydraulic fluid pressure as delivered from the master cylinder and as controlled by a spring loaded check valve upon a spring loaded piston disposed in a chamber member. The arrangement of the pistons and check valves determines whether the device is to be primarily a pressure boosting device or a pressure holding device, although in each of the embodiments the features of pressure boosting and pressure holding are combined as is more clearly set forth hereinafter.

In Figs. 1 to 5, there is shown in various views, one embodiment of the invention which is particularly adapted to compound the braking pressure without substantial loss of pedal. This is accomplished by permitting the preloading of the brakes as hereinbefore described to a given pressure before the compounding feature of the device takes effect.

Figures 1, 2, 3:
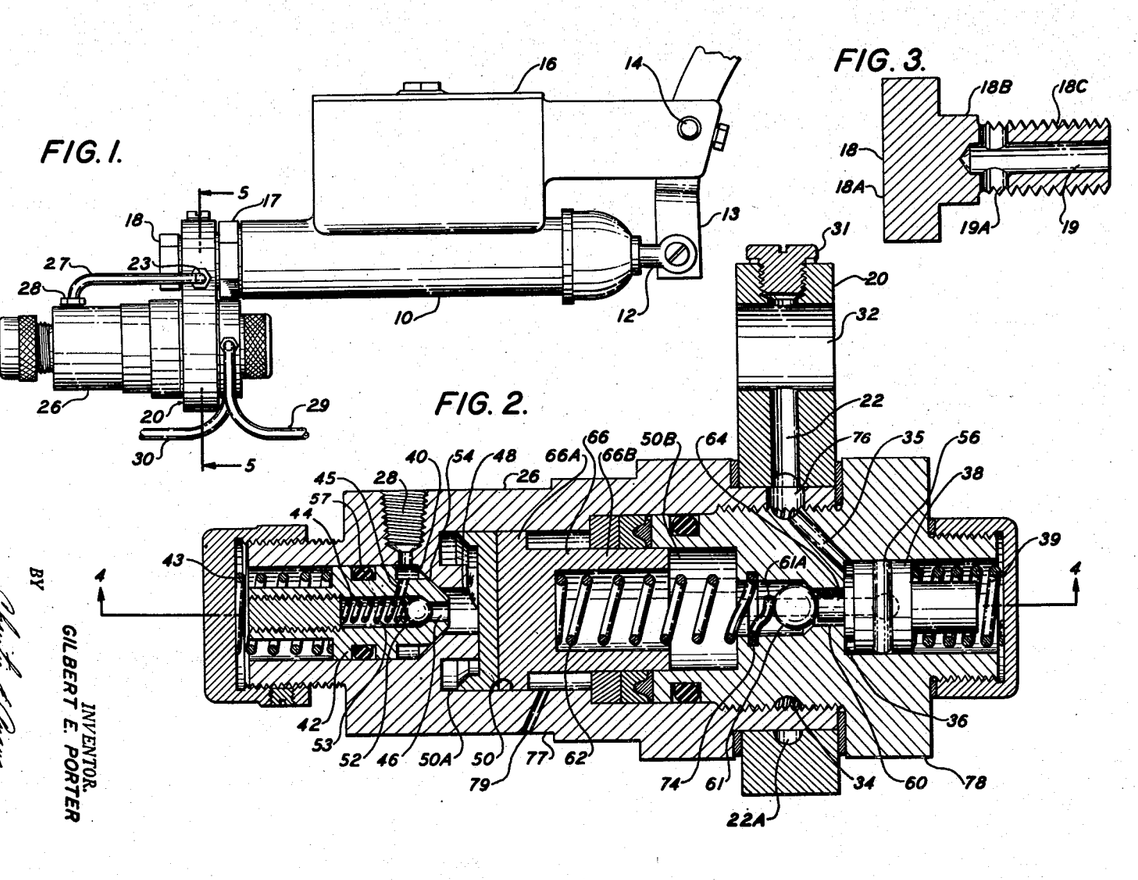
Fig. 1 is a side view of one of the embodiments of my invention, showing one means of joining it to the master cylinder of a conventional hydraulic braking system.
Fig. 2 is a sectional elevation of a braking pressure booster such as the one shown in Fig. 1 connected to the master cylinder.
Fig. 3 is a detail of a screw coupling suitable for connecting the braking aid to the master cylinder.

In Fig. 1 I have shown in side view a conventional master cylinder 10 in a hydraulic braking system which contains a motor piston (not shown) affixed to the piston rod 12. The piston rod 12 is joined to the arm 13 of the brake pedal, which is pivoted at the point 14 to the bracket 16 mounted to the master cylinder. Any movement of the brake pedal will therefore result in a displacement of the master piston within the master cylinder 10. A conventional master cylinder is provided at the discharge end with a plug member such as the plug 17 tapped to receive a fluid line leading to the individual braking units on the vehicle wheels.

According to the embodiment of my invention as shown in Fig. 1, a screw couple 18 is adapted to fit into the tap portion of the plug 17 and to support a hanger 20 from which the braking pressure booster is depended.

The screw couple 18 is shown in sectional elevation in Fig. 3 and comprises the head 18A having a shoulder 18B adapted to fit within the opening 32 (see Fig. 2) of the hanger 20. The screw couple 18 is provided with a threaded shank 18C adapted to fit within the plug 17. This shank is drilled longitudinally at 19 and transversely at 19A to provide a passageway for fluid flow from the master cylinder through the hanger member 20 as hereinafter described.

Figures 4, 5, 6, 7:
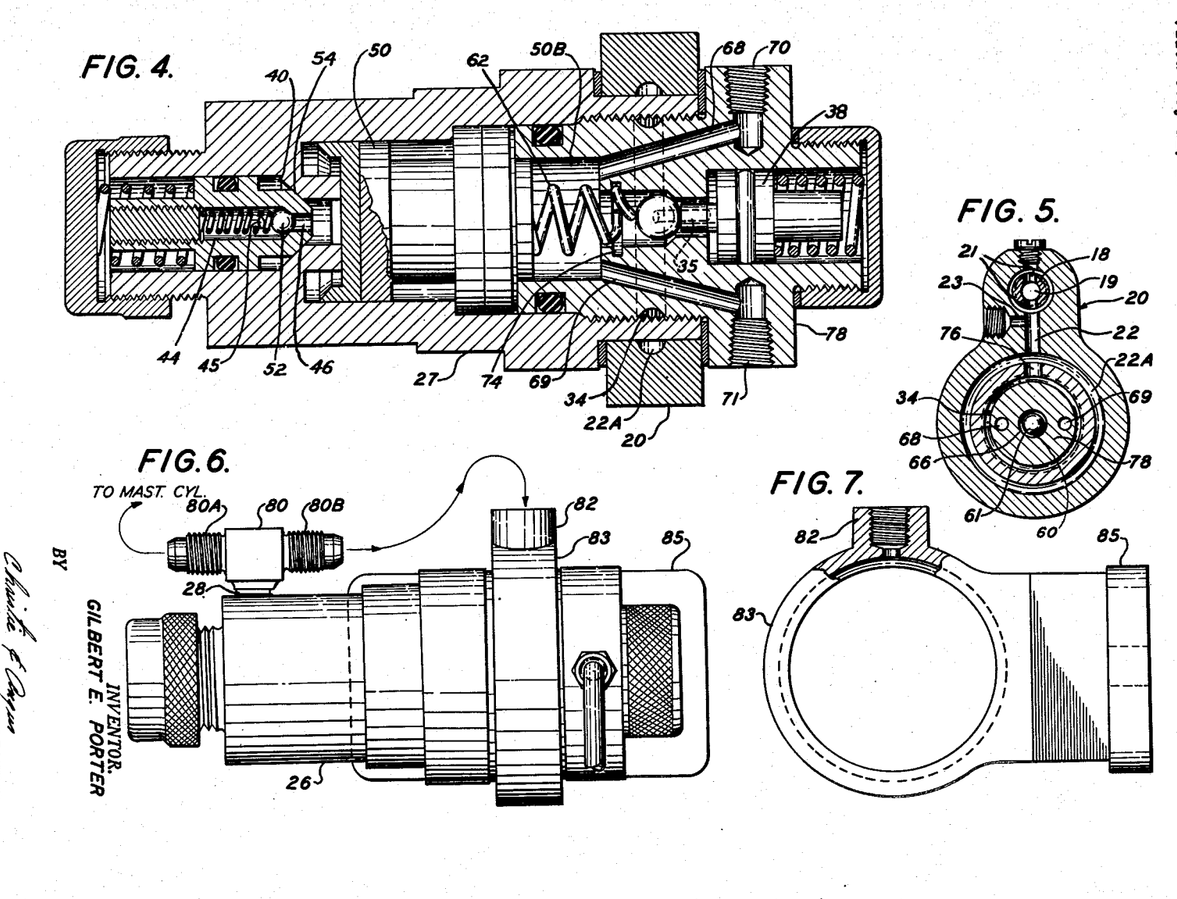
Fig. 4 is a section taken on the line 4—4 of Fig. 2.
Fig. 5 is a section taken on the line 5—5 of Fig. 1.
Fig. 6 is a side view of a modification of the apparatus shown in Figs. 2 and 4 showing an alternative means of connecting it to the master cylinder.
Fig. 7 is an end elevation of the apparatus of Fig. 6.

As shown in Fig. 5, the screw couple 18 is provided with the hole 19 in the portion thereof which passes through the hanger 20 and the hanger 20 is drilled at 22 to provide a fluid passage to the pressure boosting apparatus. In this particular embodiment the hanger 20 is also drilled transversely at 23 to connect with the hole 22 and the passageway 23 is tapped to receive a line communicating with another part of the pressure boosting device.

The pressure boosting device 26 (Fig. 1) is suspended from the master cylinder 10 by means of the hanger 20 as described and is provided with an inlet line 27 joining the hanger 20 at the point 23 and the pressure booster 26 at the port 28, and the outlet lines 29 and 30 by means of which hydraulic fluid flows to the individual braking units.

The pressure booster 26 is shown in sectional elevation in Fig. 2, and as there shown, the hanger 20 is provided with the opening 32 whereby it may be journalled to the screw coupling 18 (Fig. 1), and is tapped at 22 as above described to communicate with the pressure booster 26. The hole 22 is formed by drilling through the top of the hanger 20 and the hole thus formed in the top of the hanger above the opening 32 is closed by the plug 31.

The pressure booster 26 is journalled to the hanger 20 as shown in Fig. 2 and hydraulic fluid passing through the hole 22 flows into the annular channel 22A around the inner face of the hanger, through the hole 76 in the wall of the member 77 and into the annular groove 34 in the member 78. A hole 35 communicates between the annular channel 34 and a first chamber 36. A piston 38 is disposed within the chamber 36 and is spring-loaded therein by means of the helical spring 39 in opposition to the force of the hydraulic fluid acting on the front face of the piston 38.

At the same time that fluid flows through the line 22 into the first chamber 36, fluid also flows through the line 27 (Fig. 1) into a second chamber 40. A piston 42 is disposed in the second chamber 40 and is spring loaded by a spring 43 against the pressure of the incoming fluid. The piston 42 is hollow and fluid entering the chamber 40 passes through the hole 45 in the piston wall into the hollow portion 44. A hole 46 communicates between the hollow portion 44 and a passageway 48 leading to a third chamber 50. A check valve 52 is spring loaded within the hollow portion 44 by means of the spring 53 and controls the release fluid flow therethrough as hereinafter described. The piston 42 is faced at 54 to seat in the entrance of the passageway 48 so as to form a check valve therein.

The piston 38 in the first chamber 36 and the piston 42 in the second chamber 40 are provided with conventional O rings 56 and 57 respectively, to prevent the flow of fluid around the piston.

A passageway 60 communicates between the first chamber 36 and one end of the third chamber 50. A check valve 61 is spring loaded within the third chamber by means of the spring 61A and is adapted to close the passageway 60. However the piston 38, in the first chamber 36, is provided with a projecting pin 64 which engages the check valve 61 and prevents its closing until the fluid pressure within the first chamber 36 is sufficient to displace the piston 38 toward the right. When this displacement takes place the spring 61A forces the check valve 61 against the inner opening of the passageway 60 thereby sealing the third chamber 50 from the first chamber 36.

The third chamber 50 is in two sections; a section 50A and a section 50B. The section 50A has a larger cross-sectional area than the section 50B, and they are separated by a piston 66 which has a portion 66A conforming in cross-section to the section 50A of the chamber 50 and a portion 66B conforming in cross-section to the section 50B of the chamber 50. Piston 66 is spring loaded within the chamber 50 by means of the spring 62 which functions as a return spring as hereinafter set forth.

Referring to Fig. 4, which is a section taken on line 4—4 of Fig. 2, it is seen that the smaller section 50B of the chamber 50 is provided with two outlet holes 68 and 69 drilled in the housing 78 and communicating with the ports 70 and 71 respectively which are tapped to receive fluid lines communicating with the individual braking units.

As shown in Figs. 2 and 4, the return spring 62 is anchored at a point 74 in the housing 78 intermediate the piston 66 and the check valve 61. The spring 61A which acts as a return spring for the check valve 61 is also anchored at the point 74.

As shown in Fig. 5, to which reference has been made, fluid flowing from the master cylinder through the hole 19 in the screw coupling 18, passes through the holes 19A and into the holes 22 and 23 in the hanger 20. The hole 23 is connected by means of the line 27 to the second chamber 40, as shown in Fig. 1; and the hole 22 communicates with the first chamber by means of the annular groove 22A formed on the inner periphery of the hanger 20, the hole 76 in the member 77 which forms the housing for the third chamber 50, and the annular groove 34 in the member 78. The member 78 forms the housing for the first chamber 36 and is threaded to the member 77. As shown in Fig. 2, the member 78 is drilled at 35 to provide a passageway between the annular groove 34 and the chamber 36. Referring again to Fig. 5, the member 78 is provided with a passageway 60, closed by a check valve 61, and is also provided with the holes 68 and 69 providing means for fluid outlet from the small section 50B of the chamber 50 (Fig. 4).

The operation of the device shown in Figs. 1 to 5 is as follows: When the brake pedal is depressed, pressure is developed on the fluid in the master cylinder 10 by means of the master piston and is transmitted through hanger 20, as described, to the first chamber 36 and the second chamber 40. During the initial stages of the braking, i. e. at low braking pressure, the fluid passing into the chamber 36 passes through the passageway 60 into the small portion 50B of the third chamber 50 and through the ports 70 and 71 to the braking unit or units. Thus, for the initial braking action which involves the flow of fluid necessary to set the shoes against the braking drums, the boosting device does not alter the braking action. This means that before any pressure multiplication is accomplished, the brakes are pre-loaded, and it is this feature which permits the pressure multiplication without excessive loss of pedal. The spring 39 acting on the piston 38 against the pressure of the fluid entering the chamber 36 may be loaded at any desired value; a convenient value for the purpose has been found to be about fifty to seventy-five pounds per square inch. When the pressure in the chamber 36 is raised to this value, piston 38 moves to the right, thereby retracting the pin 64 which is attached to the piston, allowing the ball 61 which is spring loaded by the spring 61A to seat, thereby locking within the small portion 50B of the chamber 50 such oil pressure as has up to that time been built up. This oil pressure is transmitted through the lines 29 and 30 to the brake shoes. The other line 27 leads from the hanger 20 to the second chamber 40; and pressure built up in the second chamber acts against the piston 42, which is loaded against the pressure by the spring 43. The loading of this spring may be selected at will but it must in any case be in excess of the loading of the spring 39. It has been found that when the spring 39 acting on the piston 38 is loaded about fifty to seventy-five pounds per square inch, the spring 43 acting on the piston 42 will be conveniently loaded to about one hundred and fifty to one hundred and seventy-five pounds per square inch, and this will determine the pressure at which the compounding action will occur.

As set forth above, the purpose of spring loading of the piston 38 in the chamber 36 is to provide a pre-loading on the brake shoe. It may take about seventy-five pounds per square inch to produce this pre-loading effect on the brake shoe and start a light brake action. When the pressure rises to say 150 to 175 lbs., the piston 42 is pushed to the left which displacement will open the passageway 48 and allow the oil pressure to develop in the large section 50A of the third chamber 50. In the interval of time between movement of piston 38 to permit the valve 61 to close and the movement of piston 42 to open the passage 48, valve 61 is maintained open by the flow of fluid from the master cylinder to chamber 50B, until the pressure of fluid of the system reaches one hundred and fifty pounds per square inch. The effect of the pressure in the chamber 50A against the large end 66A of the piston 66 will cause the piston 66 to move toward the right compressing the fluid trapped in the small section 50B of the chamber 50. A breather hole 79 in the housing 77 permits travel of the piston 66. The effect of this motion of the piston 66 is to multiply the pressure of the fluid in the chamber 50B by a ratio equal to the ratio of the cross-sectional areas of the small and large ends of the piston 66. Thus as shown in the drawing, the small end 66B of the piston 66 has about one-half the cross-sectional area of the large end 66A. For this reason a pressure of say 300 lbs. exerted on the large end 66A of the piston by fluid entering from chamber 40 will have the effect of developing a pressure of about 600 lbs. on the fluid in the small section 50B of the chamber 50. This compounded pressure will be transmitted to the brake shoes through the lines 29 and 30. Due to the fact that the brake shoes have been pre-loaded and the compounding effect takes place only at the critical braking stage a relatively small movement of the piston 66, say in the order of approximately $\frac{3}{32}$ of an inch, will develop a tremendous braking pressure in the chamber 50B.

When the brakes are released, assuming the brake pedal is released gradually, when the braking pressure developed in the master cylinder is reduced to about 150 lbs. per square inch, the spring 43 will cause the piston 42 to move to the right closing the passage 48. Since there is a differential in the spring loading between the spring 43 and the spring 39 which differential may be on the order of 75 to 100 lbs. per square inch reduction in foot pedal pressure through the range between about 150 lbs. per square inch and 75 lbs. per square inch will be attended without loss of compounding action because the ball 61 traps the high pressure in the chamber 50. When the foot pedal pressure continues to drop the point will finally be reached, at about 75 lbs. per square inch, where the ball 61 is unseated by the piston 38 and the pressure in chamber 50B and lines 29 and 30 will bleed from said chamber 50B through the passageway 60 to chamber 36. This holding feature permits the brakes to be held at a braking pressure multiplied by the ratio of the cross-sections of the two ends of the piston 66 which reduces the effort required to hold the car on a gentle slope or the like.

When the pressure in the chamber 40 is reduced to about 50 lbs. per square inch the check valve 52 will unseat due to the high pressure drop between the large section 50A of the chamber 50 and the chamber 40 and this pressure differential will be relieved. The bleeding of this pressure will cause the piston 66 to return toward the left due to the force exerted thereon by the return spring 62 and the apparatus will thus be returned to its original condition and ready for its next braking action.

By reason of this pre-loading booster arrangement, a fairly light foot pedal pressure will start the brake action and some further increase in the foot pedal pressure will then greatly increase the braking action. After the compounding is initiated, the compounded pressure can be maintained with a reduced foot pedal pressure. This action will be attended by a smooth transition from the initial pre-loading action to the compounding action of the booster without any noticeable hesitation.

An alternate construction is shown in Figs. 6 and 7 wherein the pressure booster of Figs. 1 and 5 may be joined within the braking system in a different manner. As shown in Fig. 6 which is a side view of the brake booster device 26, for example, a three-way nipple 80 is inserted in the port 23 of the second chamber 40. The discharge end of the master cylinder 10 (Fig. 1) is connected to the inlet 80A of the nipple 80 and a line connects the opening 80B of the nipple with the coupling 83. The coupling 83 is identical to the hanger 20 shown in Figs. 2, 4 and 5 in that part which surrounds the pressure booster 26. The bracket 85 is affixed to the pressure booster 26 at one end thereof and is adapted to be joined by bolts, straps or the like to any structural member of the vehicle. This type of external construction is adapted to be employed with any of the embodiments of the invention and eliminates the necessity of depending the device from the master cylinder by means of a hanger.

Figure 8:
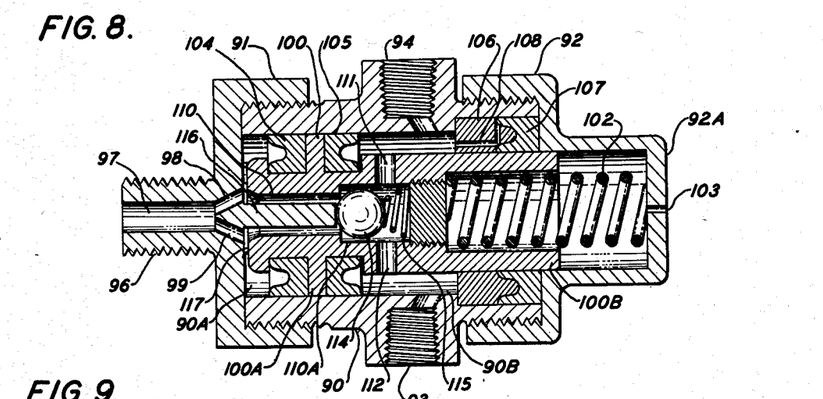
Fig. 8 is a sectional elevation of another type of braking aid according to the present invention.

Another embodiment of the invention is shown in sectional elevation in Fig. 8. This embodiment, like that shown in Figs. 1 to 5 is particularly adapted to pressure boosting. The device shown in Fig. 8 comprises a cylindrical member 90 closed at both ends by the caps 91 and 92 and provided intermediate the caps with the outlet ports 93 and 94 adapted to receive the fluid lines leading from the braking units. A hollow nipple 96 is formed integrally with the cap 91 to provide inlet means for fluid delivered from the master cylinder into the cylindrical member 90. The passageway 97 through the nipple 96 is branched to form the branches 98 and 99 opening into the cylindrical member 90. A piston 100 is disposed in the chamber 90A formed by the cylindrical member 90 and is spring loaded therein, against the pressure of the fluid entering the member, by means of the spring 102 carried in the housing 92A formed within the cap 92 and affixed to the piston 100. The housing 92A is provided with an air vent 103 for reasons hereinafter set forth.

The piston 100 is formed in two sections 100A and 100B. The section 100A is of larger cross-sectional area than the section 100B. Flow of fluid around the piston 100 is prevented by means of the sealing rings 104 and 105. The smaller portion 100B of the piston 100 extends from a point just to the left of the outlet ports 93 and 94 to the right hand end of the chamber 98 and is there provided with the metal ring 106 and the sealing ring 107 forming a liquid seal. The ring 106 is provided with a hole 108 through which a small amount of oil may pass to lubricate and pressurize the sealing ring 107. This construction of the piston 100 forms an annular chamber 90B adjacent the outlet ports 93 and 94.

The piston 100 is centrally drilled to form the passageway 110 which is expanded into a small chamber 110A communicating with the annular chamber 90B by means of the ports 111 and 112. A check valve 114 is disposed within the chamber 110A and is spring loaded therein by means of the spring 115 against the pressure of the incoming fluid. A floating pin 116 is enclosed within the passageway 110 in the piston 100. When the piston 100 is in the position shown in Fig. 8 the pin 116 engages the cap member 91 in the manner shown and serves to hold the check valve 114 away from the end of the passageway 110. In this position fluid entering the passageway 97 from the master cylinder flows through the passageway 110 around the pin 116 through the chamber 110A and through the ports 111 and 112 into the annular chamber 90B. The pressure developed in the annular chamber 90B is transmitted to the braking unit or units through the ports 93 and 94.

It will be plain that the cross-sectional area in the annular chamber 90B is considerably less than the cross-sectional area of the chamber 90A which is a full circle. Since piston 100 is spaced from the end wall of chamber 90A by boss 117, fluid pressure is exerted on the piston 100 in chamber 90A over substantially a full circle having the same diameter as the chamber and will have a greater effect on the piston than pressure developed in the chamber 90B. Thus as the pressure of the incoming hydraulic fluid is increased to a point in excess of the spring loading of the spring 102, the piston 100 will move toward the right. The motion of the piston 100 will cause the check valve 114 to seat against the end of the passageway 110 preventing further fluid flow through the passageway. Additional fluid pressure on the left hand face of the piston 100 will multiply the pressure exerted by the piston on the fluid trapped in the chamber 90B in a ratio approximately equal to the ratio of the areas of the two faces of the piston. As in the first described embodiment of the invention, the embodiment shown in Fig. 8 permits the pre-loading of the brakes by the passage of fluid through the passageway 110 and the annular chamber 90B to the braking unit prior to any compounding action. The tension on the spring 102 is adjusted so that after the initial braking stages, i. e. when the brake shoes are set against the drums, the piston will begin to move and the passageway 110 will be closed by the check valve 114. Additional motion of the piston compresses the fluid within the chamber 90B at a compounded rate dependent upon the area of pressure applied to the piston 100 as compared to the cross-sectional area of the chamber 90B.

A boss 117 is provided on the inside face of the cap 91 to prevent the piston from forming a seal with the face of the cap.

The apparatus shown in Fig. 8 also provides a holding action. Thus when the pressure on the brake pedal is gradually released the system within the brake booster remains in compounded equilibrium until such time as the pressure exerted on the left hand face of the piston 100 is less than the tension of the spring 102. Throughout this range of reduced pressure the pressure within the chamber 90B will be compounded. Thus if the loading of the spring 102 is 100 lbs. for example, fluid pressure in excess of 100 lbs. will be required to move the piston 100 toward the right and to initiate the compounding action. If a maximum fluid pressure of 500 lbs. per square inch is delivered from the master cylinder the pressure developed in the chamber 90B, assuming the cross-sectional area thereof to be approximately one-half of the cross-section of the left hand face of the piston 100, will be about 1000 lbs. per square inch. If the pressure on the brake pedal is gradually reduced from approximately 500 lbs. per square inch to approximately 100 lbs. per square inch the piston 100 will gradually move toward the left and the fluid in the chamber 90B will remain compounded at twice the exerted pressure. As the pressure is reduced below 100 lbs. the spring 102 will force the piston 100 to the extreme left, the check valve 114 will be forced open by the pin 116 allowing the high pressure to be bled from the annular chamber 90B. Thus, assuming the figures given, a braking pressure of 1000 lbs. per square inch may be maintained by pedal pressure of about 500 lbs., and similarly a pressure of 300 lbs. per square inch can be maintained by a pressure of 150 lbs.

While the foregoing embodiments of the invention were directed primarily to braking pressure boosters having some holding action, the following embodiments of the invention are directed primarily to braking pressure holders which may possess some incidental pressure compounding action. The reason that the foregoing embodiments were considered primarily as brake boosters is that provision is made therein for pre-loading the brakes which permits the compounding of pressure without appreciable loss of pedal.

Figure 9:
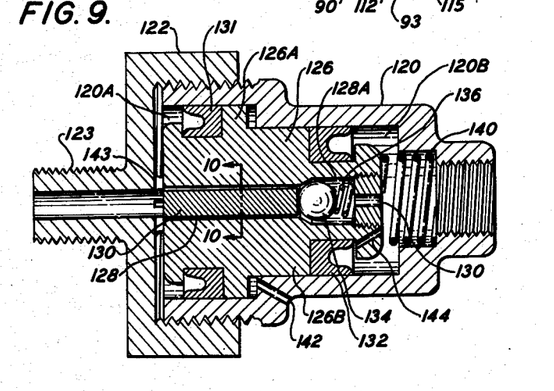
Fig. 9 is a sectional elevation of an embodiment particularly suited to holding compounded braking pressures.

The embodiment shown in sectional elevation in Fig. 9 comprises a cylindrical member 120 tapped at its right hand end to receive a fluid line from the braking unit and closed at its left hand end by the cap 122. The cap 122 is provided with a hollow nipple 123, externally threaded to receive a fluid line from the master cylinder. A piston 126 is enclosed within the cylindrical member 120 and is provided with a large cross-sectional portion 126A and a smaller cross-sectional portion 126B. The interior of the cylindrical member 120 is shaped so as to form a chamber 120A and a chamber 120B the latter being of smaller cross-sectional area than the former, and each conforming to the respective cross-sections 126A and 126B of the piston 126.

Figure 10:
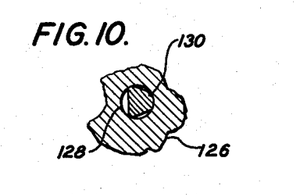
Fig. 10 is a sectional elevation taken on the line 10—10 of Fig. 9.

Piston 126 is provided with the longitudinal passage 128 in which is disposed a pin 130. As shown in Fig. 10, which is a sectional elevation on the line 10—10 of Fig. 9, the pin 130 is approximately triangular in cross-section so as to permit fluid flow through the passageway 128. The right hand end of the passageway 128 is enlarged to form a chamber 128A within the piston and this chamber communicates with the outlet end of the cylinder 120 by means of the port 130. The sealing rings 131 and 132 disposed around the sections 126A and 126B of the piston prevent fluid flow from the chamber 120A to the chamber 120B around the outside of the piston.

A check valve 134 is disposed within the chamber 128A and is spring loaded therein against the pressure of the incoming fluid by the spring 136. The piston 126 is also spring loaded against the pressure of the incoming fluid by means of the spring 140. A boss 143 prevents the piston from sealing against the inside face of the cap 122.

In operation, hydraulic fluid from the master cylinder is received into the left hand end of the cylinder and passes through the passageway 128 around the pin 130 through the chamber 128A and the port 130 to the braking units. The end of the pin 130 abutting against the end of the chamber 120A unseats the ball 134. As the braking pressure increases beyond the loading of the spring 140, the piston 126 begins to move to the right whereupon the ball 134 seats in the end of the passageway 128. An air vent 142 in the member 120 permits this motion of the piston. As the piston moves toward the right the fluid in the chamber 120B is compressed at a compounded pressure depending upon the difference in cross-sectional area between the sections 126A and 126B of the piston. The piston is provided with the hole 144 to maintain pressure equilibrium in the chamber 120B if the piston seats against the end of the chamber.

When the braking pressure is gradually released, ball 134 seats against the opening in the passageway 128 and prevents the fluid flow back towards the master cylinder. Thus a compounded braking pressure is maintained until the pressure of the fluid in the master cylinder is reduced to a point below the loading of the spring 140. At such time, the oil pressure causes the piston 126 to move toward the left; continued reduction in braking causes the pin 130 to impinge on the boss 143 and to force the ball 134 to unseat, thereby relieving the compounded pressure in the chamber 120B.

In this type of device, a compounded braking pressure may be applied by a sudden thrust of the braking pedal, for example, which would be difficult to maintain over an extended period, and this compounded pressure relationship may be held on the brakes by a considerably reduced pedal pressure by reason of the fact that the chamber 120B is sealed from the master cylinder until the pedal pressure is reduced below the spring loading of the spring 140. This type of unit is particularly advantageous in holding a vehicle on a steep hill wherein an initial thrust will set the brakes at a high pressure which may be maintained by pedal pressure, less than that normally required.

Figure 11:
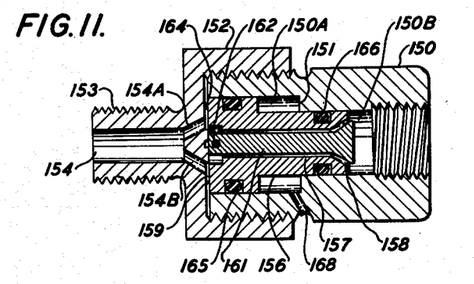
Fig. 11 is a sectional elevation of another embodiment of the invention particularly suited to holding compounded braking pressures.
Figure 12:
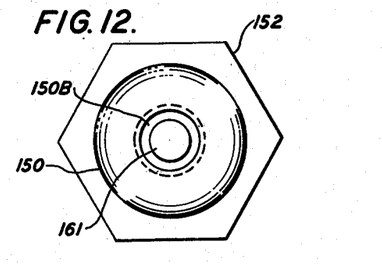
Fig. 12 is an end elevation of the apparatus of Fig. 11.

Another embodiment of the invention is shown in sectional elevation in Fig. 11 and in end view in Fig. 12. This form of the invention is particularly adapted to holding the high braking pressure once attained. The embodiment here shown comprises the cylindrical member 150 stepped at 151 to form a large portion or chamber 150A and a smaller portion or chamber 150B. The end adjacent the large chamber 150A is enclosed by cap member 152 provided with a hollow nipple 153, threaded to receive a line communicating between the master cylinder and the braking aid. The passageway 154 through the nipple 153 branches before entry into the chamber 150A into the branches 154A and 154B.

A piston 156 floats within the member 150 and conforms throughout a portion of its length to the dimensions of the chamber 150A and throughout the remainder of its length to the dimensions of the chamber 150B. The piston 156 is provided with the longitudinal passageway 157, flaring at 158 and enlarged at 159 for the reasons set forth. A pin 161 similar in shape to the pin 130 shown in Fig. 10 floats within the passageway 157. The pin 161 is provided with a transverse pin 162 which is adapted to engage the shoulder of the enlarged portion 159 of the passageway 157, to prevent the pin from migrating out of the passageway. The opposite end of the pin 161 is flared to be adapted to seat in the flared portion 158 of the passageway 157 in the manner hereinafter described. The boss 164 is formed on the inside of the cap 152 to prevent the piston 156 from facing against the inside face of the cap member. The piston 156 is provided with O-rings 165 and 166 to prevent fluid flow around the piston.

In operation, fluid from the master cylinder flows through the passageway 154 and its branches 154A and 154B, and through the passage 157 in the piston 156 and to the braking unit. When the pressure of the inlet fluid is sufficient to cause the piston 156 to move within the cylindrical member 150 away from the inlet opening, the pressure in the chamber 150B acting on the flared end of the pin 161 will seat the pin against the flared section 158 of the passageway 157. Thereafter continued thrusts of the piston 156 will compound the pressure in the chamber 150B in a ratio equal to the ratio of the cross-sectional areas of the chamber 150A and the chamber 150B. In the embodiment shown, this ratio is approximately two to one. The motion of the pistons is permitted by an air vent 168. When the braking pressure is reduced, higher pressure in the chamber 150B will continue to cause the pin 161 to seat in the passageway 157 until the piston 156 has been retracted to a point where the pin 157 strikes the boss 164. At such time as the pin strikes the boss 164, it will unseat and the fluid systems will return to equilibrium.

Figure 13:
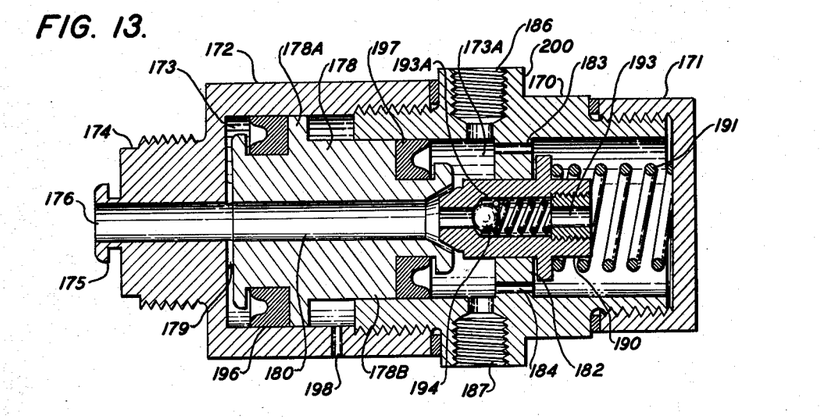
Fig. 13 is a sectional elevation of still another embodiment of the invention; and, Fig. 14 is an end view of the embodiment shown in Fig. 13.
Figure 14:
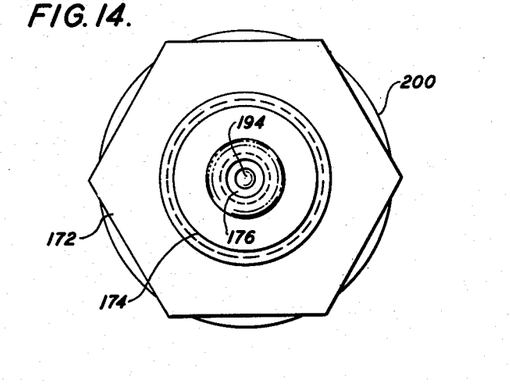

Another embodiment of the invention is shown in sectional elevation in Fig. 13, and in end view in Fig. 14 and comprises a pressure booster which is particularly adapted to a quick return of the hydraulic fluid and at the same time to the provision of means for holding a compounded braking pressure with a minimum of pedal pressure. This embodiment of the invention comprises a cylindrical member 170 provided with the cap 171 at one end and the extended cap 172 at the opposite end. The cap 172 forms an enlarged chamber 173 adjacent the chamber 173A formed by the member 170. A nipple 174 is formed integrally with the cap 172 and is provided with an external seat 175. A passageway 176 projects through the nipple 174 and the cap 172 into the interior of the chamber 173.

A piston 178 is movable within the chambers and has an enlarged end 178A conforming in cross-section to the chamber 173 and a smaller end 178B conforming in cross-section to the chamber 173A. A boss 179 on the inner face of the cap member 172 prevents the piston 178 from sealing against the inside of the cap member.

The piston 178 is provided with a longitudinal passageway 180 communicating between the chambers 173 and 173A. The chamber 173A is divided by a transverse division wall 182 provided with holes 183 and 184 to permit free flow of fluid between the two sections. The member 170 is provided with the outlet ports 186 and 187 between the inner end of the piston 178 and the division wall 182. A second piston 190 is journalled in the division wall 182 and is spring loaded by means of a spring 191 against the force of the piston 178, as hereinafter set forth. A passageway 193 is formed within the piston 190 and is provided with an enlarged section 193A. A spring loaded check valve 194 is disposed within the enlarged section 193A of the passageway 193, and is adapted to close the passageway in a manner hereinafter set forth.

The sealing rings 196 and 197 prevent fluid flow around the piston and the air hole 198 permits the motion of the piston 178.

In operation, fluid is introduced into the passageway 176 from the master cylinder (not shown) and flows through the passageway 180 in the piston 178 and out the ports 186 and 187 to the individual braking units. At such time as the pressure developed in chamber 173 is sufficient to overcome the resistance thereof to travel, the piston will move towards the right and the forward end of the passageway 180 will seat on the tapered end of the second piston 190. This motion of the piston 178 is accomplished by virtue of the fact that the cross-sectional area of the face of the piston in chamber 173 is greater than the cross-sectional area of the face within the chamber 173A. Continued travel of the piston 178 away from the inlet 176 will compound the pressure exerted on the fluid contained in the smaller chamber 173A by reason of the fact that the increased pressure within this chamber will cause the check valve 194 to seat, thereby closing the passageway 193. If the ratio of the cross-sectional areas of the outer and inner ends of the piston 178 is approximately two to one, the compounding effect produced by the motion of the piston will similarly be approximately two to one, and a pressure of say, three-hundred pounds on the fluid introduced at the point 176 will produce a pressure within the smaller chambered portion of approximately six-hundred pounds, which pressure will be transmitted through the ports 186 and 187 to the individual braking units.

As the pressure in the master cylinder is reduced, the piston 178 will begin to travel towards the inlet end of the chamber at such time as the differential between the pressure existing in the smaller portion of the chamber and that existing in the inlet portion of the chamber is sufficiently great to overcome the frictional contact between the piston 178 and the walls of the chamber. When such differential is obtained, the piston 178 will move away from the piston 190 and the pressure in the chamber 178A will be relieved through the passageway 180.

As shown in the end view of Fig. 14, the cap member 172 provided with the nipple 174 is conveniently hexagonal. Similarly the cap member 171 (not shown in Fig. 14) is conveniently hexagonal to facilitate the assembly and disassembly of the device. The shoulder 200, formed integrally with the cylindrical member 170 and having the ports 186 and 187, may be conveniently round as shown in Fig. 14.

It will be noted that in each of the foregoing embodiments the maximum stroke of the compounding piston is limited so that if, for any reason, the compounding action should fail, the regular braking equilibrium will be restored at such time as the piston has traveled this maximum distance. For example, if the unit fails to pre-load due to a broken spring or the like, or if the brake shoes are excessively worn, the necessary stroke of the compounding piston might be in excess of the maximum pedal displacement. By limiting this stroke a continued depression of the brake pedal, after further piston travel is impossible, would restore communication between the master cylinder and the braking units. In this event, although no compounding would take place, there would not be a brake failure as the regular braking action would prevail. This is an important feature of the apparatus of the invention and provides a safety factor which is lacking on many brake pressure boosting and holding devices.

The various embodiments of the invention have been illustrated and described in considerable detail, but it is to be understood that many modifications may be made in the construction thereof without departing from the scope of the invention as set forth in the foregoing description and as claimed in the following claims.

I claim:

1. In a fluid assister having an inlet adapted to be connected to a master cylinder and an outlet adapted to be connected to a device to be energized: three chambers separate from the master cylinder; fluid carrying means communicating between the master cylinder and the first and second ones of said three chambers and between the third chamber and the device to be energized; a first passageway connecting the first and third chambers; a second passageway connecting the second and third chambers; means for controlling the fluid flow through the passageways; and means in the third chamber for multiplying the pressure exerted on the fluid by the master cylinder, responsive to fluid flow from the second to the third chamber.

2. A hydraulic braking system according to claim 1 wherein said three chambers are contained within a single unit which is depended from the master cylinder by a hanger adapted to be affixed to the discharge end of the master cylinder by means of a coupling screw, said coupling screw being provided with a passageway communicating between the master cylinder and the hanger and said hanger being provided with a passageway communicating between said coupling screw and said unit.

3. In a fluid pressure assister having an inlet adapted to be connected to a master cylinder and an outlet adapted to be connected to a device to be energized: pressure boosting means comprising three chambers adapted to contain fluid under pressure, fluid flow lines communicating between the master cylinder and a first and second one of said chambers, fluid flow lines communicating between a third one of said chambers and the device to be energized, a first passageway between the first and third chambers, a check valve in said first passageway, a first spring loaded piston in the first chamber including means for holding said check valve open and adapted to travel in said chamber responsive to fluid pressure therein so as to permit said check valve to close, a second passageway communicating between the second and third chambers, a second spring loaded piston in the second chamber including means for closing said second passageway and adapted to travel in said chamber responsive to fluid pressure therein so as to open said passageway, said third chamber having two sections of differing cross-sectional area and a piston disposed therein and conforming in part to the cross-section of each of said sections, said passageway from said second chamber opening into the section of greatest cross-section.

4. A hydraulic braking system according to claim 3 wherein the spring loading of said second piston is greater than the spring loading of said first piston.

5. A hydraulic braking system according to claim 3, wherein the check valve in said first passageway is spring loaded in opposition to said first piston.

6. A hydraulic braking system according to claim 3, wherein said first piston is spring loaded to about 50 to 75 pounds per square inch and said second piston is spring loaded to about 150 to 175 pounds per square inch.

7. A hydraulic braking system according to claim 3, wherein the second piston is provided with a fluid passageway therein communicating between the second chamber and the second passageway and a spring loaded check valve controlling the flow of fluid through said fluid passageway.

8. In a fluid pressure assister: means defining a first and a second chamber; means for transmitting pressure from a source of fluid pressure to each of said chambers; a third chamber communicating with the first and second chambers; a check valve separating the first and the third chambers; a check valve separating the second and third chambers; means for transmitting fluid under pressure from the third chamber to a device to be energized; and means located in the third chamber for exerting a pressure on fluid contained therein, responsive to fluid flow between the second and third chambers.

9. A pressure booster for hydraulic systems which comprises a chambered member having a first, second and third chamber, inlet means in said first and second chambers, outlet means in said third chamber, a first passageway between the first and third chambers, a second passageway between the second and third chambers, check valve means in association with each passageway for controlling the fluid flow therethrough, the check valve means in the first passage way being normally closed and responsive to a predetermined fluid pressure to move to open position, and valve actuating means normally holding the check valve means in the second passageway in open position and responsive to a fluid pressure lower than said first mentioned fluid pressure to allow said valve in the second passageway to close, and means in said third chamber for applying a pressure on a part of the fluid therein responsive to the pressure of the fluid flowing from said second chamber when in excess of said first mentioned fluid pressure.

10. In a fluid pressure assister having an inlet adapted to be connected to a source of fluid pressure and an outlet adapted to be connected to a device to be energized: a plurality of chambers; fluid conducting means communicating with the said source of pressure to a first and a second chamber and from a third chamber to said device; a first passageway connecting the first and third chambers; a second passageway connecting the second and third chambers; means for controlling the fluid flow through the passageways; and means in the third chamber for multiplying the pressure exerted on the fluid from said source responsive to fluid flow from the second to the third chamber.

11. In a fluid pressure assister having an inlet adapted to be connected to a source of fluid pressure and an outlet adapted to be connected to a device to be energized: a differential piston impervious to fluid flow through the piston and having faces of different effective area, said outlet being in fluid communication with the assister at the smaller face of said piston; means entirely at one side of the piston providing fluid communication between said inlet and outlet; a check valve mounted in the assister independently of said piston for said communicating means, for preventing fluid flow therethrough from said outlet to said inlet, said check valve being urged closed by pressure at the outlet side thereof; means providing fluid communication between said inlet and the larger face of said piston; and a check valve for controlling the last mentioned means, said check valve being urged in the opening direction by inlet pressure.

12. In a fluid pressure assister having an inlet adapted to be connected to a source of fluid pressure and an outlet adapted to be connected to a device to be energized: a differential piston impervious to fluid flow through the piston and having faces of different effective area, said outlet being in fluid communication with the assister at the smaller face of said piston; means entirely at one side of the piston providing fluid communication between said inlet and outlet; a first check valve mounted in the assister independently of said piston for said communicating means, for preventing fluid flow therethrough from said outlet to said inlet, said check valve being urged closed by pressure at the outlet side thereof; means providing fluid communication between said inlet and the larger face of said piston; a second check valve for controlling the last mentioned means, said second check valve being urged in the opening direction by inlet pressure; and means for opening said first check valve to relieve the outlet pressure when the inlet pressure is reduced.

13. In a fluid pressure assister having an inlet adapted to be connected to a source of fluid pressure and an outlet adapted to be connected to a device to be energized: a differential piston impervious to fluid flow through the piston and having faces of different effective area, said outlet being in fluid communication with the assister at the smaller face of said piston; means entirely at one side of the piston providing fluid communication between said inlet and outlet; a check valve mounted in the assister independently of said piston for said communicating means, for preventing fluid flow therethrough from said outlet to said inlet, said check valve being urged closed by pressure at the outlet side thereof; means providing fluid communication between said inlet and the larger face of said piston; and means controlled by fluid pressure for opening said check valve to relieve the outlet pressure when the inlet pressure is reduced.

14. In a fluid pressure assister having an inlet adapted to be connected to a source of fluid pressure and an outlet adapted to be connected to a device to be energized: a differential piston impervious to fluid flow through the piston and having faces of different effective area, said outlet being in fluid communication with the assister at the smaller face of said piston; means entirely at one side of the piston providing fluid communication between said inlet and outlet; a first spring urged check valve mounted in the assister independently of said piston for said communicating means, for preventing fluid flow therethrough from said outlet to said inlet, said check valve being urged closed by pressure at the outlet side thereof; means providing fluid communication between said inlet and the larger face of said piston; a second spring urged check valve for controlling the last mentioned means, said check valve being urged in the opening direction by inlet fluid pressure; and inlet fluid pressure actuated means for opening the second mentioned spring urged check valve.

15. In a fluid pressure assister having an inlet adapted to be connected to a source of fluid pressure and an outlet adapted to be connected to a device to be energized: a differential piston having faces of different effective area, said outlet being in fluid communication with the assister at the smaller face of said piston; means providing fluid communication between said inlet and outlet; a spring urged check valve for said communicating means, for preventing fluid flow therethrough from said outlet to said inlet, said check valve being urged closed by pressure at the outlet side thereof; means providing fluid communication between said inlet and the larger face of said piston; a check valve for controlling the last mentioned means; a piston having a part engageable with the second mentioned check valve for opening said valve; and yielding means for urging the piston in a direction to effect closing of said second mentioned check valve, said piston being urged in the opposite direction by inlet pressure.

16. In a fluid pressure assister having an inlet adapted to be connected to a source of fluid pressure and an outlet adapted to be connected to a device to be energized: a differential piston impervious to fluid flow through the piston and having faces of different effective area, said outlet being in communication with the assister at the smaller face of said piston; means entirely at one side of the piston providing fluid communication between said inlet and outlet and between the inlet and the larger face of said piston; a check valve mounted in the assister independently of said piston for said communicating means for preventing fluid flow from said outlet to said inlet, said check valve being urged in the closing direction by pressure at the outlet side thereof; a spring urged normally closed check valve for controlling the communicating means between the inlet and the larger face of said piston, said check valve being urged in the opening direction by inlet pressure; and means to relieve outlet pressure when the pressure in the inlet is reduced, said means comprising a spring urged movable member normally engaging the first mentioned check valve at the inlet side to open the valve in opposition to pressure at the outlet side and fluid pressure sensitive means operatively connected to the movable member to retract the member from engagement with the first mentioned valve in response to inlet fluid pressure.

GILBERT E. PORTER.

REFERENCES CITED

The following references are of record in the file of this patent:

UNITED STATES PATENTS

| Number | Name | Date |
| --- | --- | --- |
| 1,620,115 | MacKenzie | Mar. 8, 1927 |
| 1,970,999 | Ferris et al. | Aug. 21, 1934 |
| 2,191,716 | Hunt | Feb. 27, 1940 |
| 2,272,360 | Swift | Feb. 10, 1942 |
| 2,351,153 | Schnell | June 13, 1944 |
| 2,368,103 | Bauer | Jan. 30, 1945 |
| 2,372,015 | Rockwell | Mar. 20, 1945 |
| 2,381,004 | Schnell | Aug. 7, 1945 |
| 2,381,930 | Schnell | Aug. 14, 1945 |
| 2,399,270 | Vickers | Apr. 30, 1946 |